3,448,306
MOLDED BOBBIN FOR SYNCHRONOUS MOTOR
Stephen F. Murray, Heather Hills, Indianapolis, Ind., assignor to P. R. Mallory & Co., Inc., Indianapolis, Ind., a corporation of Delaware
Filed Aug. 30, 1967, Ser. No. 664,533
Int. Cl. H02k 7/10
U.S. Cl. 310—83   11 Claims

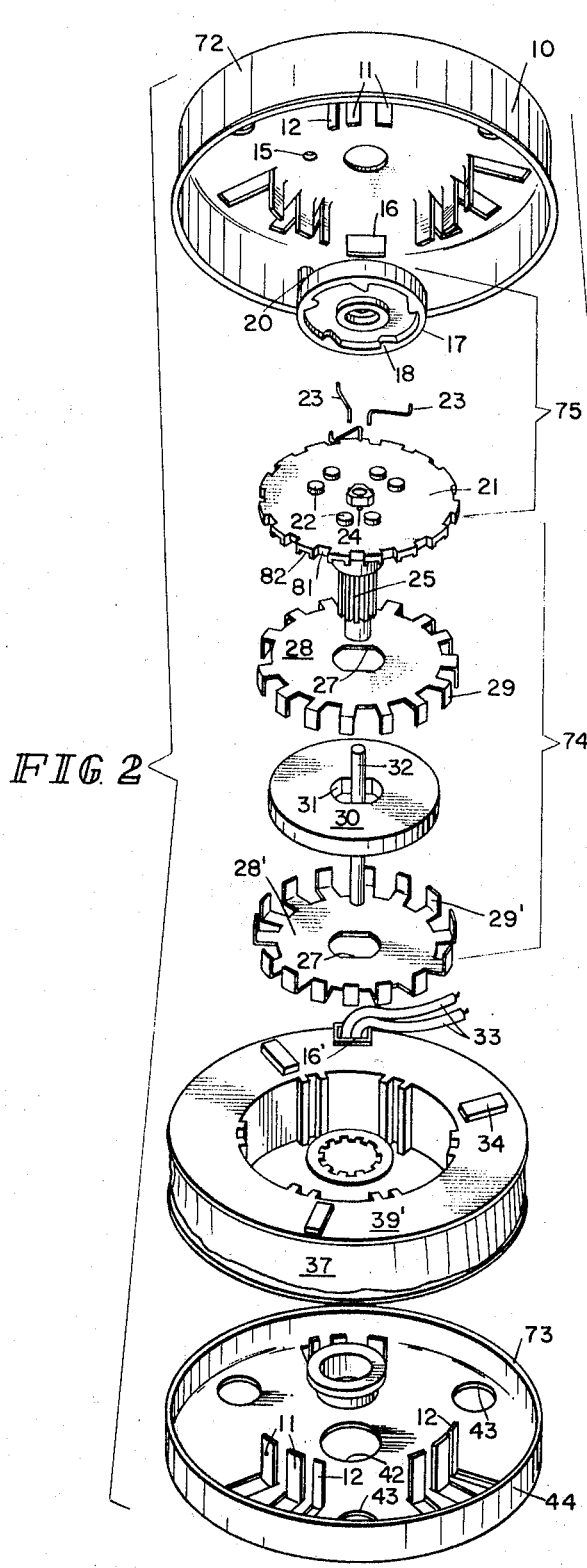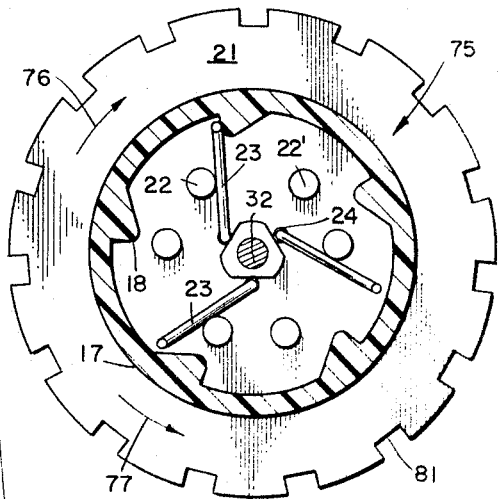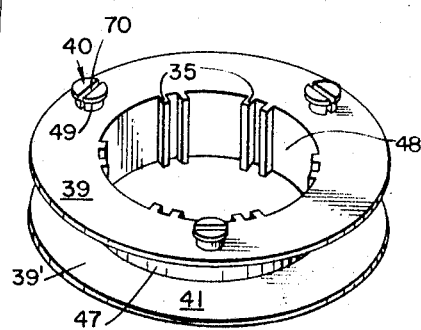

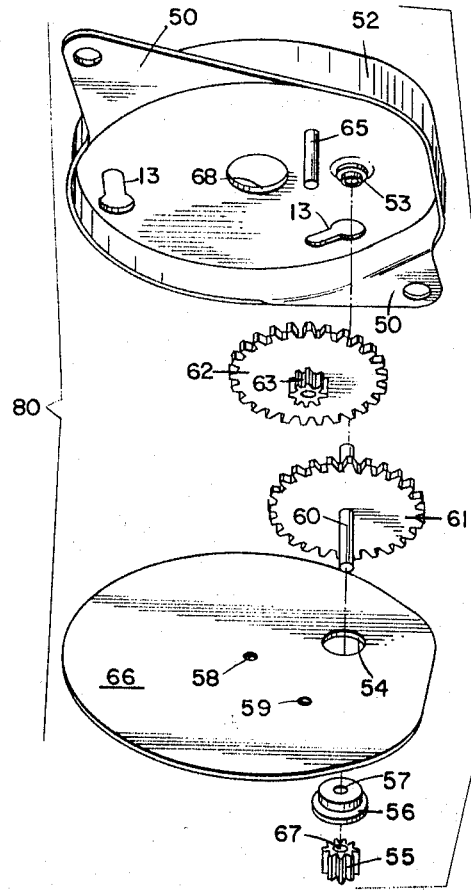
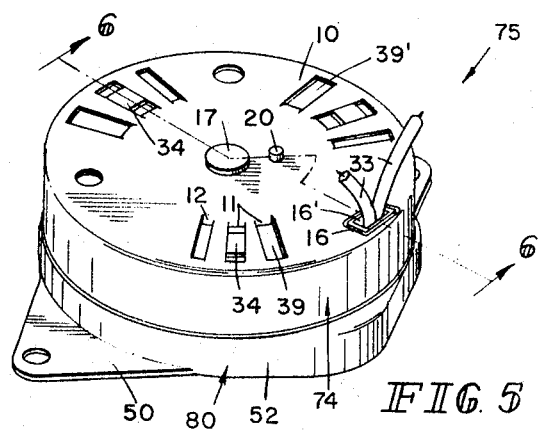
FIG. 4
FIG. 5
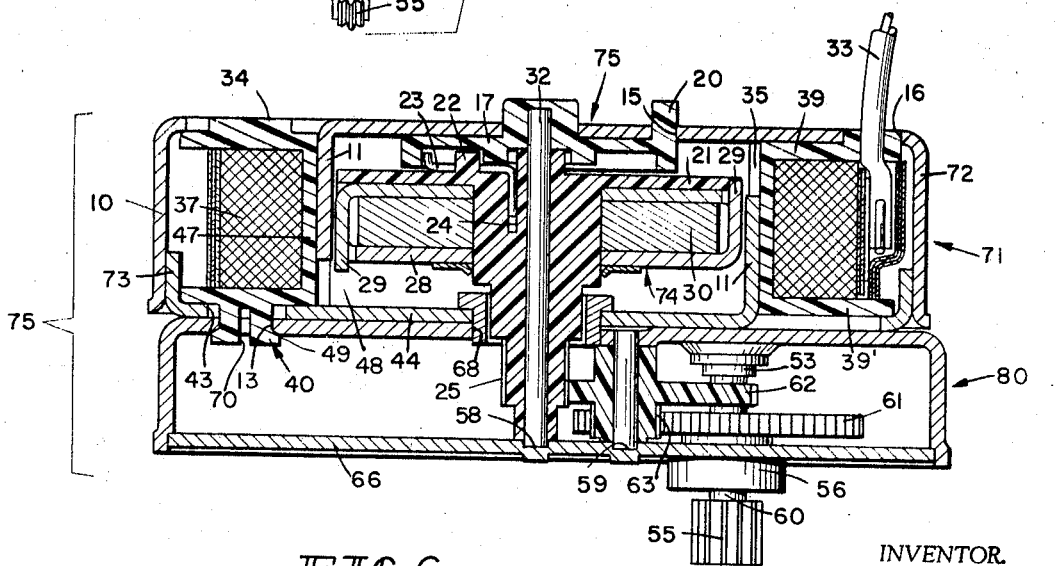
FIG. 6
INVENTOR.
STEPHEN F. MURRAY
BY
*Robert Levine*
ATTORNEY

United States Patent Office 3,448,306
Patented June 3, 1969

ABSTRACT OF THE DISCLOSURE

A synchronous motor in combination with a detachable gear train means. The motor includes a molded coil bobbin means including studs or legs having such shape so as to afford smooth entry into apertures provided in the housing of the gear train means and locking with the housing of the gear train means upon arcuate displacement of the motor with respect to the housing of the gear train means. When the motor is locked with the gear train means, the pinion thereof is predeterminately and automatically aligned with the input gear of the gear train. The stud means of the bobbin means assists in predeterminately, automatically and accurately aligning the pinion of the motor with the input gear so as to substantially prevent wearing of the gears and crowning of the teeth of the gears of the gear train.

---

The present invention relates generally to self-starting synchronous motors, and more particularly to wire wound coil enclosures for synchronous motors with directional drive control means.

A multitude of applications for synchronous motors of the type using a permanent magnet rotor are known. Some of the applications for synchronous motors are as a drive means for timing devices such as electric clocks and the like, and as a drive means for sequence timers such as the type used with washing machines, dishwashers, dryers and the like.

Generally, the synchronous motors utilize a wire wound coil enclosure or molded spool or bobbin upon which is wound a coil of wire of a predetermined number of turns usually called a field coil. Molded spools or bobbins have been fabricated by a variety of methods using various thermoplastic and thermosetting materials. Several of the prior art molded spools or bobbins retaining the field coil are so shaped and positioned as to fit between the end plates of the motor assembly housing and engage with the inner periphery of the housing walls. The engagement of the outer periphery of the spool or bobbin with the inner periphery of the housing substantially prevents lateral or sideways displacement of the bobbin and, hence, displacement of the field coil with respect to the housing. The bobbin of synchronous motors may be restrained from axial movement by exerting compressive and shear stress forces on the bobbin as a result of interposing the bobbin between an end plate of the housing for the motor and a disc means which includes the field poles of the motor.

The synchronous motor has a high r.p.m. output which must be reduced significantly, if the motor is to be used with a sequence timer. The generally accepted practice is to reduce the output speed of the motor by interposing a gear reduction means between the output of the motor and the input of the sequence timer. Generally, the gear train cooperatively associated with the pinion of the motor is incorporated within the housing retaining the motor. It is seen that the general construction of the motor necessitates replacement of the entire motor assembly if any one of the gear teeth of the gear train becomes crowned or reaches the end of the useful life through some other type of failure. In addition, it is apparent that if one desires to alter the gear reduction of the gear train so as to achieve, for example, a higher output speed, the entire motor assembly must be replaced rather than merely replacing the inexpensive gear train which is the source of difficulty.

Although satisfactory for their intended limited purpose, the several bobbins or coils do have drawbacks if the function thereof is expanded. For example, if the bobbin could be modified, the bobbin itself could serve as a means of coupling a detachable gear train means in accurate mating engagement with the pinion of the motor thereby overcoming the problems outlined above. Further modification of the bobbin may make it adaptable to serve as a means for accurately locating the stator poles of the motor. In addition, the bobbin may be further modified so as to include boss means which minimizes the compressive and shear stress forces exerted on the bobbin where the bobbin is compressively retained between the end plate and the disc means including the field poles of the motor.

It was found that by integrally molding resilient mounting studs or legs with the bobbin which project externally of the motor housing, the mounting studs or legs served several functions, such as for example, providing easy and convenient detachment of the motor from the gear train housing yet permitting accurate alignment of the pinion of the motor with the appropriate input gear of the gear train, providing firm support for the motor on the gear train housing when the combination of the motor and gear train is subjected to abusive handling, and of providing a relatively wide stabilization base for the motor during both normal and abusive handling thereof. In addition, it was found that by integrally molding bosses with the bobbin, the bosses largely absorbed the compressive and shear stress forces exerted on the bobbin by the end plates of the motor and served as a means for accurately locating the bobbin with respect to the end plates of the motor housing. Furthermore, it was found that if the bore of the bobbin included determinately located rib means, the rib means served as a means for accurately locating the stator poles of the motor which is critical in order to assure proper running of the motor.

Accordingly, it is an object of the present invention to provide an economically wire wound enclosure for a synchronous motor which overcomes each of the aforementioned problems in the synchronous motor art.

Another object of the present invention is to provide a wire wound enclosure for a synchronous motor having integral mounting stud which afford rapid, predetermined, automatic and accurate mounting of the motor to a detechable gear train means.

Yet another object of the present invention is to provide a wire wound enclosure for a synchronous motor having integral mounting studs or legs which provide stabilization and accurate alignment of the motor with a gear train when the motor is mounted on the cooperatively associated gear train.

Yet another object of the present invention is to provide a molded bobbin for a synchronous motor having integral mounting studs or leg means having such shape so as to afford smooth entry thereof into apertures provided in the housing of the gear train and locking therewith upon arcuate displacement of the motor with respect to the gear train thereby accurately aligning the pinion of the motor with an input gear of the gear train and so as to prevent withdrawal of the stud means from the housing of the gear train.

A further object of the present invention is to provide a molded bobbin for a synchronous motor having integral mounting stud or leg means which have a positive locking action with the housing of a gear train.

Another object of the present invention is to provide a molded bobbin for a synchronous motor having integral mounting studs or legs, integral boss means and integral rib means that is characterized by its simplicity of construction and its economy of fabrication.

Still another object of the present invention is to provide a molded bobbin for a synchronous motor having integral mounting stud or leg means that accurately and automatically locates the pinion of the motor with respect to the input gear of a gear train so as to substantially prevent wear of the gears and crowning of the gear teeth.

Another object of the present invention is to provide a molded bobbin for a synchronous motor including integral boss means which largely absorb the compressive and shear stress forces to which the bobbin may be subjected by the housing of the motor.

Yet another object of the present invention is to provide a molded bobbin for a synchronous motor which includes a bore having rib means for accurately positioning the stator poles of the motor within the bore.

The present invention, in another of its aspects, relates to the novel features of the instrumentalities of the invention described herein for teaching the principal objects of the invention and to the novel principles employed in the instrumentalities whether or not these features and principles may be used in the said objects and/or in the said field.

With the aforementioned objects enumerated, other objects will be apparent to those persons possessing ordinary skill in the art. Other objects will appear in the following description, appended claims and appended drawings. The invention resides in the novel construction, combination, arrangement and cooperation of elements as hereinafter described and more particularly as defined in the appended claims.

The appended drawings illustrate an embodiment of the present invention constructed to function in the most advantageous modes devised for the practical application of the basic principles employed in the hereinafter described invention.

In the drawings:

FIGURE 1 is an isometric view of the coil bobbin means showing the stud means, the boss means and the rib means of the coil bobbin means;

FIGURE 2 is an exploded isometric view of the synchronous motor illustrating the molded bobbin with a field coil wound thereon;

FIGURE 3 is a sectional plan view of a one-way device cooperatively associated with the synchronous motor;

FIGURE 4 is an exploded isometric view of the gear train means;

FIGURE 5 is an isometric view of the motor and the gear train means coupled together; and FIGURE 6 is a sectional view taken across the lines 6—6 of FIGURE 5 showing the cooperative relationship of various components of the motor assembly.

Generally speaking, the present invention relates to an automatically alignable coil enclosure means used to effect the combination of a synchronous motor with a gear train means. The molded coil bobbin is comprised of a tubular section terminating in flanges and resilient stud means integrally formed with one of the flanges and extending therefrom. The gear train means includes a housing having apertures corresponding to the stud means. The stud means have a flanged portion that extends beyond the corresponding aperture in the gear train housing. Each of the stud means are adapted to be received in the corresponding aperture in the gear train housing and engage with the housing in a locking relationship thereby effectively securing the gear train means to the synchronous motor. The pinion of the synchronous motor is properly aligned and cooperatively associated with the input gear of the gear train means thereby substantially preventing undue wear of the cooperatively associated teeth of the pinion and the input gear.

Referring now to FIGURE 1 of the drawing, a molded bobbin means is generally indicated by reference numeral 41. The bobbin 41 may be fabricated from any suitable thermoplastic material such as polycarbonate and the like. In addition, the bobbin may be fabricated from thermosetting type resins and plastics such as phenolics and the like. The bobbin is comprised of a tubular section 47 terminating in flanges 39 and 39', integral mounting stud or leg means 40 equally spaced about flange 39 and projecting therefrom, and rib means 35 traversing the length of bore 48.

The mounting stud means 40 are integrally formed with the bobbin 41 and project therefrom in substantially the same direction. It is seen that the mounting studs have an axis that is in substantially spaced parallel relationship with respect to the major axis of the bobbin. It should be noted that the mounting stud means are fabricated from the same plastic material as is the bobbin. The shape of the mounting stud means 40 is such so as to afford smooth entry of the stud into keyhole-shaped apertures 13 in cup-shaped means 52 which serves as a portion of the housing of the gear train means 80 shown in FIGURE 4. The stud interfits with the reduced portion of the keyhole-shaped aperture upon the application of a moderate pressure which arcuately displaces the motor with respect to the gear train assembly. The leading edge of each stud includes a flange or shoulder portion 49 which projects through cooperatively associated apertures 43 of the lower end plate 44 and engages with the underside of the cup-shaped means 52 of the gear train means. Note that the apertures 43 are equally spaced from one another. The stud means 40, illustrated in FIGURE 1, has a double D-shaped cross section to facilitate subsequent locking thereof with the underside of the cup-shaped means 52 of the gear train means. Note that a channel 70 separates the respective sections of the stud.

Although the stud means shown in FIGURE 1 includes a substantially flat shoulder portion, it will be understood that the stud means may include leading edges which are chamfered or rounded or angulated so as to be compressed as the leading edge enters and progresses through the aperture in the mounting chassis thereby facilitating entrance of the stud into the cooperating aperture in the housing of the gear train means. Upon exit of the leading edge of the stud through the cooperatively associated aperture in the gear train housing, the stud will expand to its normal position and the flanged edge will engage the underside of the housing thereby effectively locking the motor to the gear train means.

The aforementioned integral mounting studs do not require the use of ancillary hardware or special tools in securing the same to the housing of the gear train means. It should be seen that the embodiment in FIGURE 1 is substantially complete in and of itself as far as the locking feature is concerned. The integral mounting studs may be modified so as to be adaptable to several purposes such as including more studs and/or larger studs for mounting larger motors to the gear train.

The rib means 35, integrally molded with the coil bobbin means, are utilized to locate and guide to determined positions within the bore of the bobbin the stator poles generally formed from the motor housing. The stator poles are indicated by reference numerals 11 and 12 in FIGURE 1 and respectively project from upper end plate 10 and lower end plate 44 which are predeterminately joined so as to provide the housing for the motor.

The boss means 34 are equally spaced about the flange 39' of the bobbin and serve the functions of predeterminately positioning the bobbin with respect to cup 10 and of absorbing a high percentage of the compressive and shear stress forces exerted on the bobbin as upper and lower end plates 10 and 44 of the housing together.

Referring now to FIGURE 2, a self-starting synchronous motor is indicated by reference numeral 71. The self-starting synchronous motor includes upper end plate 10 and lower end plate 44 illustrated as an annular disc fabricated from any suitable magnetic material, such as cold-rolled steel or the like. End plates 10 and 44 each include an outer rim 72 nd 73 respectively. As shown in FIGURE 6, a portion of the outer rim of each of the end plates interfit with the other so as to provide a suitable housing for the synchronous motor. A plurality of stator poles 11 and 12 are stamped in radial fashion respectively from the end plates 10 and 44 so as to be substantially at right angle with the end plates 11 and 12 and in spaced parallel relationship with the respective rim of the end plate. The stator poles are formed from the end plates so that when the end plates are fitted together, as shown in FIGURE 6, the stator poles of the upper plate 10 are interleaved with the stator poles of the lower plate 12 and are determinately positioned with respect to one another in bore 48 of the bobbin by rib means 35.

A field coil 37 is wound on axially apertured bobbin 41. The coil 37 includes a lead means 33 projecting through aperture 16' formed in flange 39' of the bobbin and aperture 16 of the upper end plate 10. The lead means coupled to any suitable AC source (not shown). As shown in FIGURE 6, the boss means 34 engage with predetermined ones of the apertures formed by the stamping of the stator poles from the upper end plate 10 so as to predeterminately locate the bobbin and hence the field coil with respect to the end plate 10.

Journalled between the end plates 10 and 44 and positioned between the diagonally opposite stator plates 11 and 12 is rotor means 74 of the synchronous motor 71. The rotor means includes a knurled output shaft or pinion 25 fixedly connected to disc 21, a bearing shaft 32, an apertured cylindrical permanent magnet means 30 having a major surface of one polarity and another major surface of opposite polarity and rotor pole means 28 and 28'. It is seen that rotor pole means 28 is engaged with one major surface of permanent magnet means 30 while rotor pole means 28' engages with the remaining major surface of the magnet means thereby polarizing the rotor pole means 28 and 28'. It is seen that poles 29 and 29' of rotor means 28 and 28' are interleaved so that adjacent rotor poles will have an opposite polarity.

The disc 21, integrally formed with the knurled shaft, includes a plurality of slots 81 into which poles 29' fit and substantially C-shaped notch 82 into which the poles 29 fit. The disc serves to determinately space the adjacent poles from one another thereby providing a determined air gap spacing between adjacent rotor poles. The knurled shaft has fixedly connected thereto pole means 28 and 28' and permanent magnet means 30 by any suitable connection such as by a press fit, welding or the like.

The lowermost surface of the permanent magnet includes a pole face of one polarity while the uppermost surface of the permanent magnet includes a pole face of opposite polarity. The polarity of rotor poles 29 overlying and engaging with the uppermost surface of the permanent magnet means assumes the polarity of the uppermost surface of the magnet means. A plurality of rotor poles 29' underlying and engaging with the lowermost surface of the permanent magnet means assumes the polarity of the lowermost surface of the magnet. The rotor poles 29 and 29' are interleaved so that adjacent rotor pole faces have an opposite polarity. The permanent magnet means 30 is fabricated from any suitable hard ferrite material. The rotor poles are fabricated from any suitable magnetic soft material such as cold-rolled steel or the like.

The operation of the synchronous motor illustrated herein is similar to the operation of the synchronous motor described and illustrated in copending application Ser. No. 529,333, filed Feb. 23, 1966, and assigned to the assignee of the present invention, P. R. Mallory & Co., Inc,. of Indianapolis, Ind.

FIGURES 2 and 3 depict a one-way device 75 cooperatively associated with the synchronous motor to assure that the motor rotor rotates in a desired direction. The one-way device permits rotation of the rotor in one direction while substantially preventing rotation of the rotor in a second direction. The one-way device includes pivotal substantially Z-shaped spring means 23, cam means 18, a plurality of stop pin means 22 and 22' and a housing 17. An extremity of each of the Z-shaped spring means 23 interfits with an aperture 24 formed in the mold disc 21 which is integrally formed with the knurled shaft or pinion 25. The remaining extremity of the Z-shaped spring means is free to move as the spring means is pivoted in the cooperatively associated aperture 24 by the interaction between the free end of the spring and the cam 18. It is seen that upon rotation of the rotor in the clockwise direction, or the direction of arrow 76, the free end of Z-shaped spring means 23 is wedged in the corner formed by the steep side of cam 18 and adjacent wall 45 of the housing 17. Further displacement of the rotor in the clockwise direction causes stop pin 22 to engage with the spring means 23 as shown in FIGURE 2. Determined additional displacement of the stop pin and hence determined displacement of the spring means 23 is incurred due to the resilience of the spring means. Displacement of the Z-shaped spring means stores energy therein. When energy stored by spring means 23 is released the rotor is deflected in the counterclockwise direction or the direction of arrow 77. Continued rotation in the counterclockwise direction of rotor 74 and hence disc 21, causes the free end of the spring means 23 to ride up the gradual incline of cam 18 thereby deflecting or pivoting the Z-shaped spring means in aperture 24 in the clockwise direction until the free extremity of the spring means engages with stop pin 22'. Stop pin 22' prevents further pivotal displacement of the Z-shaped spring means in the direction in the clockwise direction. A dowel 20 of housing 17 is cooperatively associated with an aperture 15 formed in end plate 10 so as to prevent displacement of the one-way device with respect to the end plate 10. As illustrated in FIGURE 3, an uneven number of cams 18 and spring means 23 are used so that only one spring is actually used to reverse the direction of the rotor to the desired direction thereby permitting reversal with the least possible delay due to the placement of the cam and the spring means.

FIGURE 4 illustrates an exploded isometric view of the gear train means 80 consisting of a cup-shaped means 52 with oppositely projecting mounting ears 50. The major surface of the cup-shaped means 52 includes a plurality of keyhole slots 13 pierced near the periphery thereof and spaced equally from one another. The keyhole slots 13 are used to receive and lock with the studs 40 of the bobbin means as shown in FIGURE 6. A bearing 53 is staked to the inside base of cup-shaped means 52. A first shaft 60 is pressed through a first gear 61. A second shaft 65 is pressed through a second gear 62 and a pinion 63. A base plate 66 for cup-shaped means 52 has first and second perforations 58 and 59 and a hole 54 which accepts a bushing 56 and is staked in place. Shaft 60 passes freely through hole 57 and is press-fitted into hole 67 of pinion 55. The hole 68, in the axial center of cup-shaped means 52, is a pilot hole which assists in providing accurate alignment between the pinion of the drive motor and the input gear of the gear train means.

FIGURE 6 illustrates stud means 40 in an interference fit with a keyhole aperture 13 formed in the cup-shaped means 52 of the gear train means so as to lock the motor 71 with the gear train means thereby forming motor assembly 75. Note the accurate alignment of the pinion 25 with the input gear 62 of the gear train means to thereby substantially prevent crowning of the input gear of the gear means.

While the invention is illustrated and described in an embodiment, it will be understood that modifications and variations may be effected without departing from the scope and novel concepts of this invention as set forth in the appended claims.

Having thus described my invention, I claim:

1. In a synchronous motor in combination with a gear train means, a wire wound enclosure comprised of a tubular section terminating in flanges and resilient stud means integrally formed with one of said flanges and extending therefrom, said gear train means including a housing having apertures corresponding to said stud means, said stud means having a flanged portion that extends beyond the corresponding aperture in said gear train housing, each of said stud means being adapted to be received in said corresponding aperture in said gear train housing and engaging with said housing in locking relationship thereby effectively securing said gear train means to said synchronous motor so that the pinion of said synchronous motor is predeterminately and automatically aligned and cooperatively associated with the input gear of said gear train thereby substantially preventing undue wear of the cooperatively associated teeth of said pinion and input gear.

2. In a synchronous motor in combination with a gear train means as claimed in claim 1, wherein said wire wound enclosure is a molded coil bobbin means.

3. In a synchronous motor in combination with a gear train means as claimed in claim 2, wherein said stud means of said coil bobbin project from said coil bobbin substantially parallel to the axis of said coil bobbin.

4. In a synchronous motor in combination with a gear train means as claimed in claim 2, wherein said stud means of said coil bobbin is a means having a double D-shaped cross section and a shoulder engaging with an edge of said gear train housing in locking relation thereby effectively securing said gear train means to said motor.

5. In a synchronous motor in combination with a gear train means as claimed in claim 4, wherein said double D-shaped stud means includes a channel separating respective sections of said stud means.

6. In a synchronous motor in combination with a gear train means as claimed in claim 2, wherein the inner periphery of said tubular section of said coil bobbin includes rib means for locating and positioning stator poles of said synchronous motor within said tubular section and with respect to each other.

7. In a synchronous motor in combination with a gear train means as claimed in claim 6, wherein said rib means are predeterminately positioned about said inner periphery of said tubular section and longitudinally traverse said inner periphery.

8. In a synchronous motor in combination with a gear train means as claimed in claim 2, wherein said bobbin means includes boss means for absorbing substantially all compressive and shear stress forces to which said bobbin is subjected by the housing of said motor.

9. In a synchronous motor in combination with a gear train means as claimed in claim 8, wherein said boss means of said bobbin means are a plurality of equally spaced bosses formed on said flange of said bobbin opposite said flange carrying said stud means.

10. In a synchronous motor in combination with a gear train means as claimed in claim 2, wherein said bobbin has conductive wire wrapped therearound and terminal leads projecting through an aperture in one of said flanges.

11. In a synchronous motor in combination with a gear train means as claimed in claim 2, wherein said apertures in said gear train housing are keyhole-shaped apertures, said stud means of said coil bobbin locked with said housing of said gear train means by arcuately displacing said stud means in said keyhole-shaped apertures a determined distance.

References Cited

UNITED STATES PATENTS

| | | | |
|---|---|---|---|
| 2,465,042 | 3/1949 | Schlenker | 310—164 X |
| 3,146,363 | 8/1964 | Sidell et al. | 310—42 X |
| 3,164,734 | 1/1965 | Heinzen | 310—162 X |
| 3,268,751 | 8/1966 | Nebiolo et al. | 310—162 X |
| 3,307,056 | 2/1967 | Woolley | 310—83 X |

MILTON O. HIRSHFIELD, *Primary Examiner.*

E. SUTTON, *Assistant Examiner.*

U.S. Cl. X.R.

310—162